(12) United States Patent
Horiuchi et al.

(10) Patent No.: US 6,731,269 B2
(45) Date of Patent: May 4, 2004

(54) INFORMATION TERMINAL WITH KEYBOARD

(75) Inventors: Mitsuo Horiuchi, Sagamihara (JP); Fusanobu Nakamura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 09/961,630

(22) Filed: Sep. 24, 2001

(65) Prior Publication Data

US 2002/0047832 A1 Apr. 25, 2002

(30) Foreign Application Priority Data

Oct. 25, 2000 (JP) ........................................ 2000-325398

(51) Int. Cl.[7] ............................. G09G 5/00; G06F 1/16
(52) U.S. Cl. ........................ 345/168; 345/361; 361/680
(58) Field of Search ................................. 345/168–169, 345/905; 361/680–684; 400/490–493

(56) References Cited

U.S. PATENT DOCUMENTS

| 5,483,418 A | * | 1/1996 | Hosoi | ........................ 361/680 |
| 5,966,284 A | * | 10/1999 | Youn et al. | .................. 361/680 |
| 6,038,892 A | * | 3/2000 | Schmitt | ......................... 70/78 |
| 6,104,604 A | * | 8/2000 | Anderson et al. | ........... 361/680 |
| 6,212,066 B1 | * | 4/2001 | Fetterman | .................... 361/680 |

* cited by examiner

*Primary Examiner*—Richard Hjerpe
*Assistant Examiner*—Duc Q Dinh
(74) *Attorney, Agent, or Firm*—J. Bruce Schelkopf

(57) ABSTRACT

Provided for, is an information terminal 1 and keyboard and system units thereof, capable of making the mounting of the keyboard unit into the system unit easier with reliable electrical and mechanical connections. The present invention is equipped with a keyboard unit 2 detachable to a system unit 5. The keyboard unit 2 in the information terminal 1 is equipped with a base plate 4; a keyboard-unit-side engaging member 7, disposed on the bottom surface of the base plate 4, for detachably engaging with the system unit 5; and a plurality of input keys 3 disposed on the top surface of the base plate 4 opposite to the bottom surface on which the keyboard-unit-side engaging member 7 is disposed. The system unit 5 is equipped with a system-unit-side engaging member 8 for detachably engaging with the keyboard-unit-side engaging member 7.

11 Claims, 4 Drawing Sheets

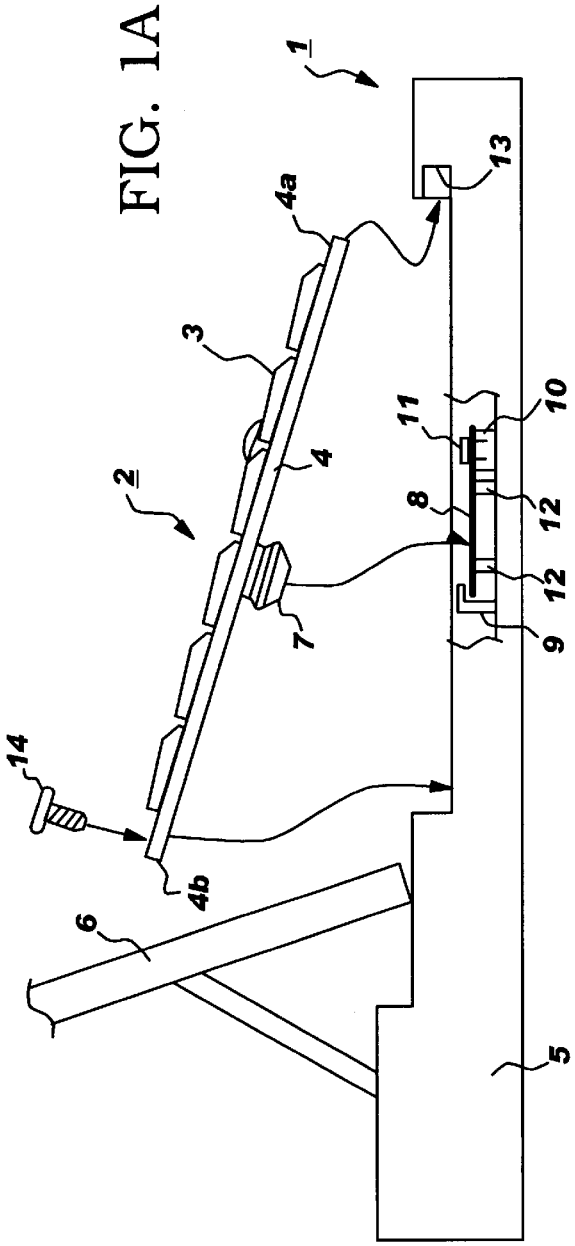

INFORMATION TERMINAL WITH KEYBOARD

BACKGROUND OF THE INVENTION

1. Field of the Invention

The present invention relates generally to an information terminal, such as a notebook-sized personal computer (PC), etc., and keyboard and system units thereof, and more particularly to an information unit in which a keyboard unit can be readily mounted in a system unit, and the keyboard and system units thereof.

2. Description of Related Art

A keyboard in a notebook-sized PC, in addition to being one of the input devices, structurally functions as one of the covers and also functions as a shield plate for intercepting external noise and electric wave noise emitted from the device itself. Because of this, a base plate (usually made of metal) constituting the keyboard unit must be electrically and mechanically connected with reliability.

Similarly, as the keyboard may or may not be provided with a system unit, it is known to provide a keyboard with a removable connection such that a keyboard may be removed, repaired, replaced, or substituted with another input device as a particular function may require.

For instance, it is often necessary to mount a keyboard unit according to the language that is employed in the specific country in which it is to be used. Additionally, it may also be more efficient to previously assemble a system unit excluding a keyboard (semi-finished product), mount a keyboard unit while having a keyboard on order, in the semi-finished system unit, and ship the finished product in a very short time. Further, often there exists the danger that a keyboard will be subjected to damage simply when used in normal operation given the environment in which it is used (e.g., such as a case where coffee is spilt on the keyboard, or where a heavy item could fall on the keyboard).

Thus, it is necessary to provide for the situation where a user can replace a keyboard unit when it fails.

However, since keyboard units may also be connected with a speaker, an audio card, audio jacks (e.g., a headphone and a microphone-in), etc., a method of mounting and dismounting the keyboard unit so that it can be reliably carried out even by users having no skill, while ensuring the integrity of the electrical and mechanical connection, is desired.

Thus, the keyboard unit has various important roles. However, mounting of the keyboard unit into the system unit is usually performed by placing the top surface of the notebook-sized PC downward, then driving a plurality of small screws into the bottom surface, and mounting the keyboard while it is being pulled downward. Because of this, there is often a problem in that the keyboard unit cannot be easily mounted in the system unit.

SUMMARY OF THE INVENTION

An object of the present invention is to provide an information terminal and keyboard and system units thereof, which are capable of making mounting of the keyboard unit into the system unit easier while reliably providing for electrical and mechanical connections, while eliminating the problems mentioned above.

The information terminal of the present invention is equipped with a keyboard unit detachable with a system unit. The keyboard unit is equipped with (a1) a base plate, (a2) a keyboard-unit-side engaging member, disposed on the bottom surface of the base plate, for detachably engaging with the system unit, and (a3) a plurality of input keys disposed on the top surface of the base plate opposite to the bottom surface on which the keyboard-unit-side engaging member is disposed. The system unit is equipped with (b1) a system-unit-side engaging member for detachably engaging with the keyboard-unit-side engaging member.

In the information terminal of the present invention described above, the keyboard unit can be mounted in the system unit only by engaging the keyboard-unit-side engaging member with the system-unit-side engaging member.

In a preferred embodiment of the information terminal of the present invention, the keyboard-unit-side engaging member is a hook button. Also, the system-unit-side engaging member is a hairpin spring. In addition, the keyboard unit is mounted in the system unit by fitting the hook button into the hairpin spring. In the preferred embodiment, the keyboard unit can be easily mounted in the system unit by fitting the hook button into the hairpin spring. Also, electrical and mechanical connection can be reliably performed between the keyboard unit and the system unit. For that reason, easy assembling, prevention of the floating of the keyboard (particularly, the central portion), and strengthening of an EMI radiation countermeasure and ground for ESD and RF can be achieved when mounting the keyboard unit into the system unit.

In another preferred embodiment of the information terminal of the present invention, the hairpin spring is positioned toward the keyboard unit so that the keyboard unit is pulled toward the system unit, with the hook button fitted in the hairpin spring. This preferred embodiment makes the electrical and mechanical connection of the keyboard unit with the system unit more reliable. Particularly, this preferred embodiment is capable of effectively preventing floating of the keyboard.

In another preferred embodiment of the information terminal of the present invention, a portion of a front end portion of the base plate of the keyboard unit is engaged with a groove provided in the system unit. Also, the hook button is fitted into the hairpin spring. Furthermore, at a rear end portion of the base plate of the keyboard unit, the base plate is screwed to the system unit. In the third preferred embodiment, screwing becomes necessary, but the number of places to be screwed can be reduced compared with the related art. Also, the screwing operation can be performed through the top surface of the system unit, and simple mounting can be maintained. In addition, the keyboard unit can be firmly connected electrically and mechanically to the system unit.

In another preferred embodiment of the information terminal of the present invention, two tip portions of the hairpin spring are fixed by a pin base. Also, the hairpin spring is provided at each of two positions on the system unit which are symmetric with respect to a center of the base plate. Furthermore, the base plate is made of aluminum, the hook button is made of brass, the hairpin spring is made of stainless steel, and the system unit is made of Carbon Fiber Reinforced Polymers (CFRP). CFRP have low specific gravity, excellent mechanical properties (high specific tensile strength, high specific elastic modulus. etc.) and preferred performance characteristics (electric conductivity, heat resistance, low thermal expansion coefficient, chemical stability, self-lubrication property, high heat conductivity, etc.) for the present invention. Similarly, it will be further understood by those of ordinary skill in the art that various changes in the details, materials, and arrangements of the parts which are described and illustrated herein in order to explain the nature of this invention may be made by those skilled in the art without departing from the principle and scope of the invention as expressed in the following claims, and as such, the above referenced and additional envisioned embodiments are capable of effectively achieving the present invention in a variety of ways.

The keyboard unit of the present invention is generally constructed so that it detachably engages with a system unit of an information terminal. The keyboard unit is equipped with (a1) a base plate; (a2) a keyboard-unit-side engaging member, disposed on the bottom surface of the base plate, for detachably engaging with the system unit; and (a3) a plurality of input keys disposed on the top surface of the base plate opposite to the bottom surface on which the keyboard-unit-side engaging member is disposed.

Furthermore, the system unit of the present invention is configured to detachably engage with a keyboard unit which includes a base plate, a keyboard-unit-side engaging member, disposed on the bottom surface of the base plate, for detachably engaging with the system unit, and a plurality of input keys disposed on the top surface of the base plate opposite to the bottom surface on which the keyboard-unit-side engaging member is disposed. The system unit is equipped with a system-unit-side engaging member for detachably engaging with the keyboard-unit-side engaging member.

The keyboard and system units of the present invention described above can be satisfactorily used in the information terminal of the present invention when mounting the keyboard unit into the system unit.

BRIEF DESCRIPTION OF THE DRAWINGS

FIG. 1A is a diagram of a method of mounting the keyboard unit in a preferred embodiment of the present invention;

FIG. 1B is a diagram of a method of mounting the keyboard unit in a preferred embodiment of the present invention;

DETAILED DESCRIPTION

Figure 2A:
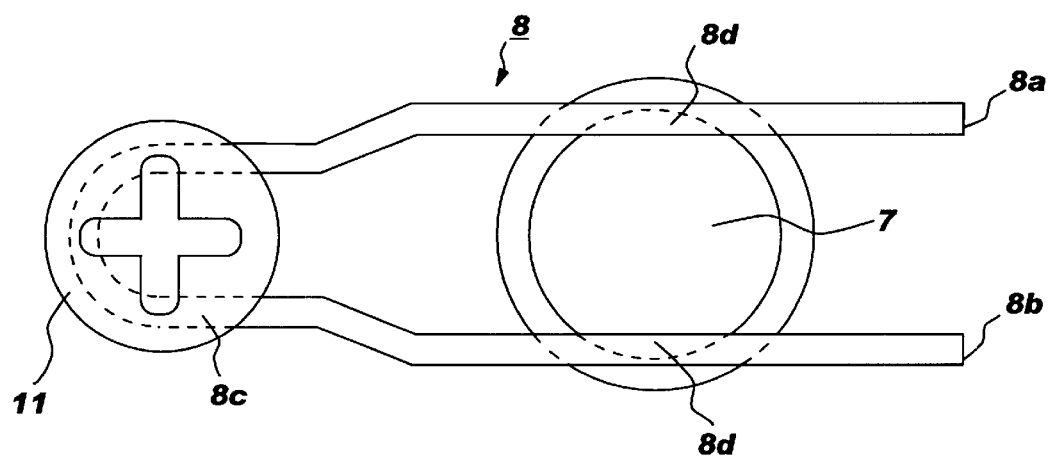
FIG. 2A is a diagram showing a state in which, the hook button is fitted in a hairpin spring in a preferred embodiment of the present invention.

FIGS. 1A and 1B are diagrams of a method of mounting the keyboard unit in a preferred embodiment of an information terminal of the present invention, respectively. In FIGS. 1A and 1B, there is shown an example where the present invention is applied to a notebook-sized personal computer (PC) 1 that is an information terminal. In this example, a keyboard unit 2 is constructed of a keyboard 3 and an aluminum base plate 4. Reference numeral 5 denotes a system unit made of Carbon Fiber Reinforced Polymers (CFRP). Also, reference numeral 6 denotes a liquid crystal display (LCD) panel.

The method, according to the present invention, for mounting the keyboard unit of the information terminal is characterized in that the keyboard unit 3 is mounted in the system unit 5, by providing a brass hook button 7 on the bottom surface of the base plate 4 opposite to the top surface on which the keyboard 3 is provided, providing a hairpin spring 8 for receiving the hook button 7, which consists of stainless steel such as SUS304, etc., on the side of the system unit 5, and engaging the hook button 7 with the two line portions 8d of the hairpin spring 8.

In this example, the hook button 7 has previously been fixed to the base plate 4, as shown in FIG. 1B. The two end portions 8a and 8b of the hairpin spring 8 are fixed by a pin base 9 provided in the system unit 5. The pin base 9 prevents the hairpin spring 8 from being widened more than is necessary or being disengaged, when the hook button 7 is fitted into the hairpin spring 8, and also regulates the upward movement. In addition the curve portion 8c of the hair spring 8 is screwed to a brass stud 10 by a small screw 11 so that it is fixed to the system unit 5. Furthermore, the two parallel line portions 8d of the hairpin spring 8 are held by ribs 12 at both sides of a position where the hook button 7 is fitted. This prevents the hairpin spring 8 from sinking more than is necessary when hook button 7 is fitted into the hairpin spring 8.

In this example, the hook button 7 is fitted into the hairpin spring 8, with the front end portion 4a of the base plate 4 of the keyboard unit 2 engaged with a groove 13 provided in the system unit 5, when the hook button 7 is fitted into the hairpin spring 8. At the rear end portion 4b of the base plate 4 of the keyboard unit 2, the base plate 4 is fixed to the system unit 5 with a screw 14.

Thus, by fitting and mounting the hook button 7 into the hairpin spring 8, the keyboard 2 can be mounted in the system unit 5 with a simple operation of positioning and pushing the keyboard unit 2 into the system unit 5. Additionally, the base plate 4 can be reliably made the same potential as the system unit 5, because the hook button 7 and the two line portions 8d of the hairpin spring 8 are also in electrical contact with each other with reliability. Thus, this structure effectively operates as an EMI radiation countermeasure or RF ground.

More specifically, a preferred embodiment of the present invention is equipped on the bottom side of the keyboard unit 2 with a speaker, an audio card, audio jacks (e.g., a headphone jack, a microphone-in), etc. These components are connected with the system main body through a FPC. If this structure is not shielded, there is a possibility that it will function as an antenna for receiving electric waves and guide electric wave noise into the system, for example, in the case where a portable telephone is used near the notebook-sized PC 1. In addition, there is a possibility that electric waves generated within the system will be emitted to the outside. However, such a problem can be avoided because the conductive base plate 4 of the keyboard unit 2 makes electrical contact with the conductive portion of the system unit 5. For example, a pointing device controller 26 shown in FIG. 4B converts an operation to a pointing device 25 to an electrical analog value, and amplifies and converts the analog value to a digital value. Additionally, electric wave noise to components for handling analog signals before amplification is a problem that has to be particularly avoided. The construction in the preferred embodiment of the present invention is capable of solving such a problem.

Figure 2B:
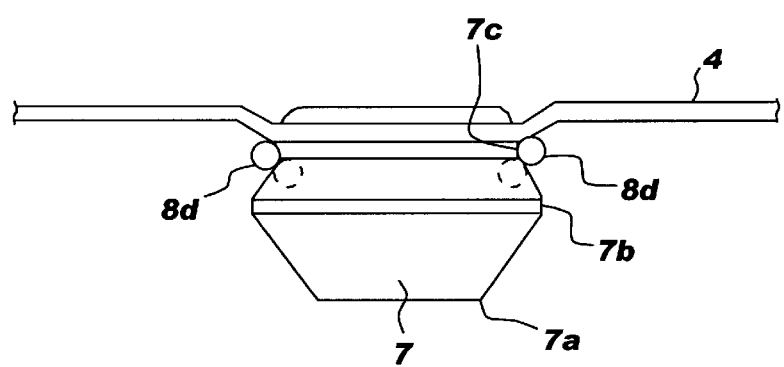
FIG. 2B is a diagram showing a state in which, the hook button is fitted in a hairpin spring in a preferred embodiment of the present invention.

FIGS. 2A and 2B are diagrams showing the state in which, in a preferred embodiment of the present invention, the hook button 7 has been fitted in the hairpin spring 8, respectively. As shown in FIGS. 2A and 2B, the hook button 7 is gradually increased in diameter from a minimum radius portion 7a to a maximum radius portion 7b and is gradually decreased in diameter from the maximum radius portion 7b and provides a pin holding portion 7c that is in contact with the base plate 4 of the keyboard unit 2.

When fitting the hook button 7 into the hairpin spring 8, the lower minimum radius portion 7a slightly greater than the gap between the two line portions 8d of the hairpin spring 8 is first pushed into between the two line portions 8d, while gradually expanding the gap between the two line portions 8d. At this time, the tip portion 8a of the hairpin spring 8 is constructed so that it is widened to a certain degree within the pin base 9. Thereafter, after the two line portions 8d have reached the maximum radius portion 7b, the two line portions 8d are received in the pin holding portion 7c of hook button 7 with a force which is generated when the two line portions are closed with each other. Thus, the hook button 7 can be fitted into the hairpin spring 8.

If the hook button 7 is fitted into the hairpin spring 8 in this manner, the position of the hairpin spring 8 in a normal state before fit, shown in by a phantom line in FIG. 1B, is moved to the side of the keyboard unit 2, as shown by a solid line in FIG. 1B. For that reason, the keyboard unit 2 can be constructed so that it is pulled to the side of system unit 5. This enables the keyboard unit 2 to be firmly mounted in the system unit 5.

Note that while, in the preferred embodiment of the present invention, the hook button 7 is disposed on the side of the keyboard unit 2 and the hairpin spring 8 on the side of the system unit 5, the present invention can be carried out even if both are conversely disposed. In addition, the engaging members, provided in the keyboard unit 2 and the system unit 5, can implement the present invention, even if they are members other than the hook button 7 and the hairpin spring 8. For instance, not only the hairpin spring but also a metal line in the form of "#" can be employed, conductive silicon rubber conforming to the shape of the hook button can be employed, and the present invention can be executed even by a coil spring, a plate spring, a torsion bar, etc. In addition, it is desirable that the engaging portions 7 and 8 of the keyboard unit 2 and system unit 5 be in electrical contact with each other. However, if they can electrically contact with each other by other constructions, it will be sufficient if they physically engage with each other.

Figure 3:
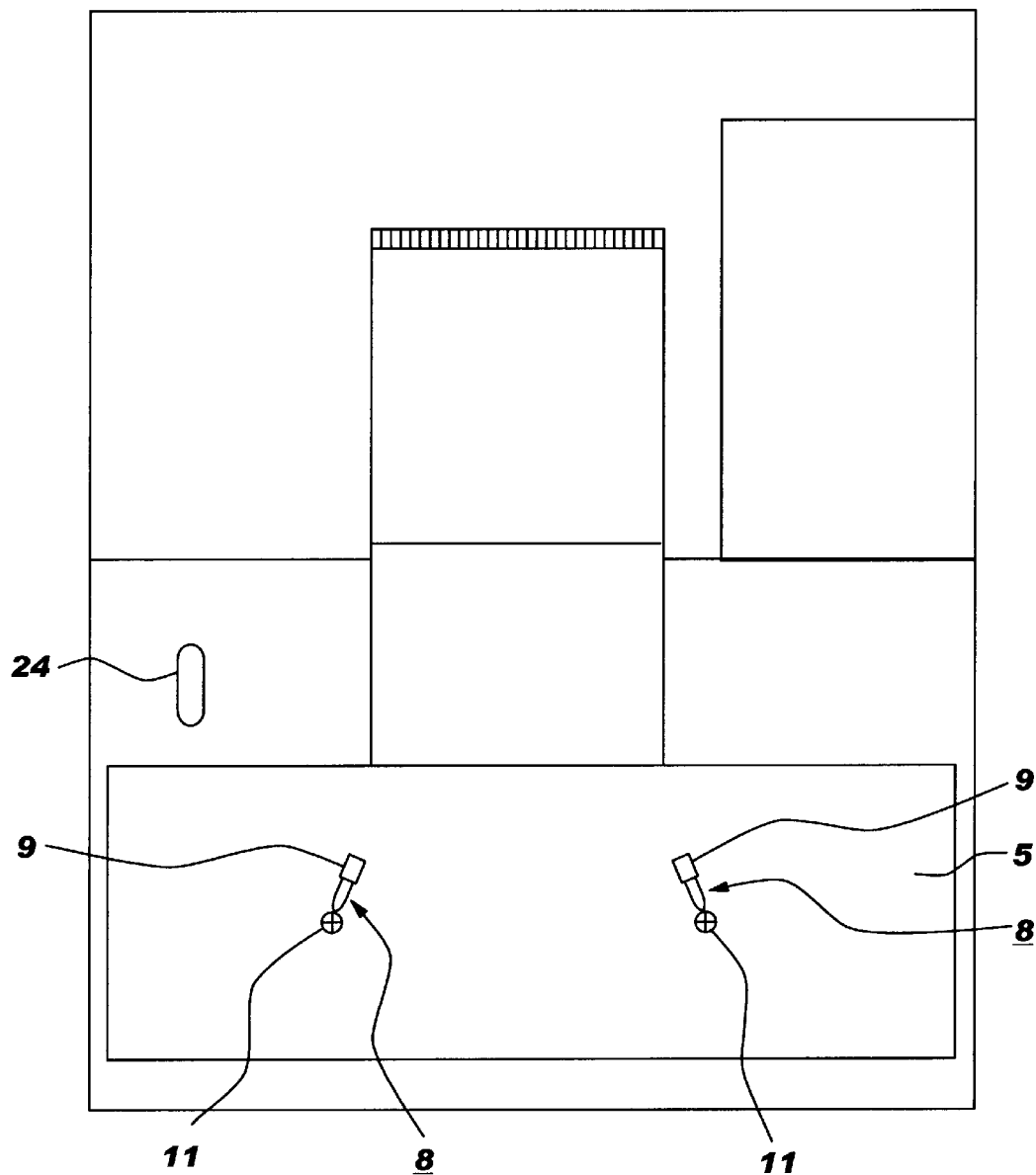
FIG. 3 is a diagram of a position at which, the hairpin spring is provided in a preferred embodiment of the present invention.

FIG. 3 is a diagram of a position at which, the hairpin spring 8 is provided in the system unit 5 in a preferred embodiment. In the example shown in FIG. 3, two hairpin springs 8 are provided at positions on the system unit 5 which are symmetric with respect to the center of the base plate 4. Thus, if the two hairpin springs 8 are provided at positions symmetric with respect to the center of the base plate 4, floating of the central portion of the keyboard unit 2 can be suitably prevented.

Figure 4A:
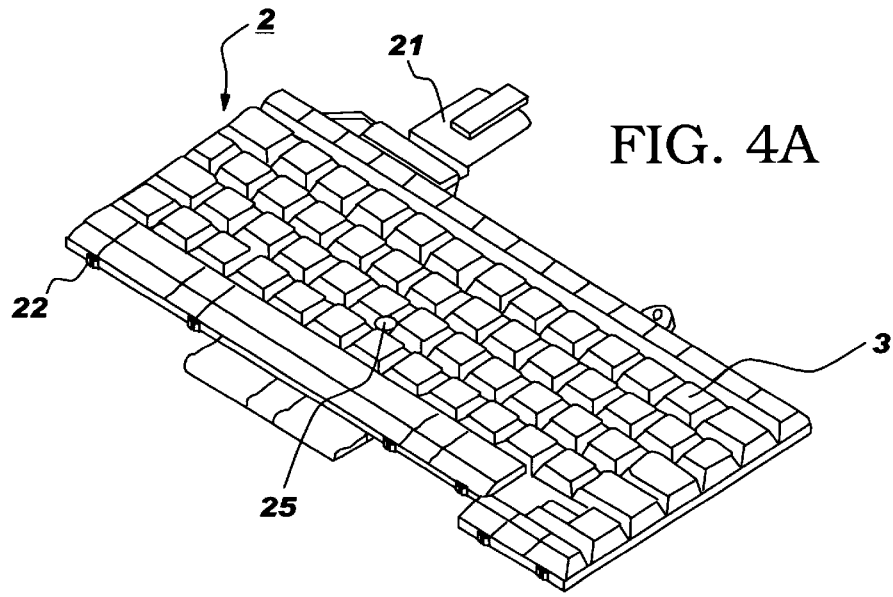
FIG. 4A is diagram of the keyboard unit in a preferred embodiment of the present invention.
Figure 4B:
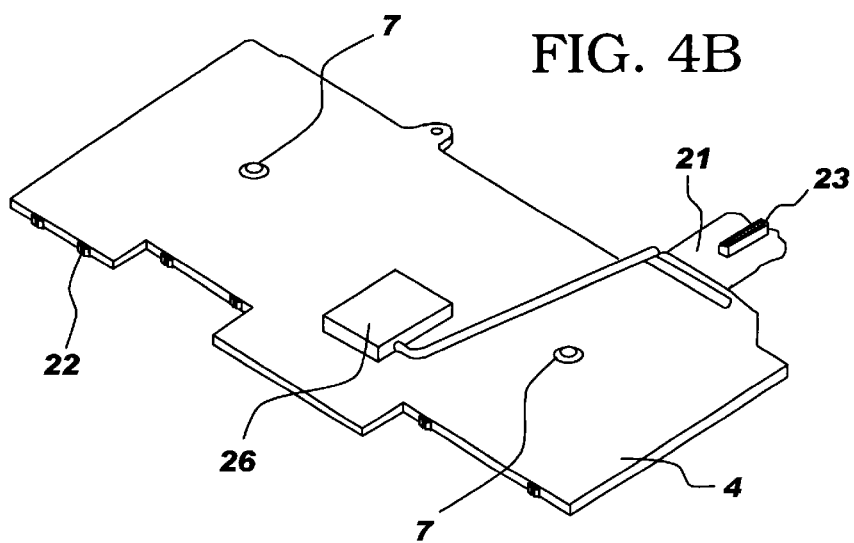
FIG. 4B is diagram of the keyboard unit in a preferred embodiment of the present invention.

FIGS. 4A and 4B are diagrams of the keyboard unit 2 in their respective preferred embodiments. FIG. 4A shows the top surface of the keyboard 3; FIG. 4B shows the bottom surface of the base plate 4. This example shows a keyboard unit 2 that is mounted in the system unit 5 shown in FIG. 3. For that reason, two hook buttons 7 are provided at symmetrical positions with respect to the center of the base plate 4. In this example, reference numeral 21 is a connecting portion. The connecting portion 21 is equipped with a keyboard 3, and a keyboard-unit-side connector 23 for performing an electrical contact with the outside. The keyboard unit 2 and the connecting portion 21 are connected through a membrane sheet so that the connecting portion 21 is movable with respect to the keyboard unit 2. Thus, if the connecting portion 21 is provided in the outside, not in the space surrounded by the system unit 5 and the keyboard unit 2, the connected state of the keyboard-unit-side connector 23 can be checked visually.

In addition, if the connecting portion 21 is pulled with the keyboard unit 2 mounted in the system unit 5, the hook button 7 can be easily removed from the hairpin spring 8. Reference numeral 22 indicates a plurality of claws that engage with the groove 13 provided in the end portion 4a of the base plate 4. With such a structure in the preferred embodiment of the present invention, if the screw 14 is removed, the keyboard unit 2 can remove the keyboard-unit-side connector 23 from a system-unit connector 24 (see FIG. 3) and, at the same time, the keyboard unit 2 can be removed from the system unit 5, by an operation of lifting up the connecting portion 21 from the system unit 5.

According to the present invention, as clear from the foregoing description, the keyboard unit is easily mounted in the system unit only by engaging the keyboard-unit-side engaging member with the system-unit-side engaging member. In the preferred embodiment, the hook button is fitted into the hair spring. This enables simple mounting of the keyboard unit into the system unit and also enables reliable electrical and mechanical connection between the keyboard unit and the system unit. As a result, easy assembling, prevention of the floating of the keyboard (particularly, the central portion), and strengthening of an EMI radiation countermeasure and ground for ESD and RF can be achieved when mounting the keyboard unit into the system unit.

What is claimed is:

1. An information terminal comprising a keyboard unit and a system unit, wherein said keyboard unit comprises:
   a base plate having a top surface and a bottom surface;
   a keyboard engaging member, disposed on said bottom surface of said base plate, and
   a plurality of input keys disposed on said top surface of said base plate and said system unit comprises a system engaging member for physically and detachably engaging with said keyboard engaging member to engage said keyboard unit toward said system unit, wherein at least one of said keyboard engaging member and said system engaging member is configured to have a varying radial dimension, wherein said keyboard engaging member is a hook button, said system engaging member is a hairpin spring, and said keyboard unit is mounted in said system unit by positioning said hook button into said hairpin spring, and
   wherein two tip portions of said hairpin spring are fixedly positioned by a pin base.

2. The apparatus according to claim 1, wherein, with said hook button is firstly positionable in contact with said hairpin spring, and said hairpin spring is secondly positionable toward said keyboard unit so that said keyboard unit is pulled toward said system unit.

3. The apparatus according to claim 1, further comprising a lip edge on said base plate configured to be relationally engaged with a wall groove of said system unit.

4. The apparatus according to claim 1, wherein said hairpin spring is symmetrically provided at each of two positions on said system unit with respect to a center of said base plate.

5. The apparatus according to claim 1, wherein said base plate is made of aluminum, said hook button is made of brass, said hairpin spring is made of stainless steel, and said system unit is made of Carbon Fiber Reinforced Polymers (CFRP).

6. The apparatus according to claim 1, wherein said base plate is fixedly adapted to said system unit at a rear end portion of said base plate of said keyboard unit.

7. The apparatus of claim 6, wherein said base plate is screwed to said system unit.

8. The apparatus of claim 1, wherein said system engaging member and said keyboard engaging member are in electrical and physical contact causing said keyboard unit to be engaged toward said system unit.

9. The apparatus of claim 1, wherein said keyboard engaging member has a radius at its center greater than the radius at a distal end of said keyboard engaging member in relation to said base unit.

10. The apparatus of claim 1, wherein said keyboard engaging member has a radius at its center greater than the radius at a distal end of said keyboard engaging member in relation to said base unit, and a lip edge on said base plate configured to be relationally engaged with a wall groove of said system unit.

11. A keyboard unit for detachably engaging with a system unit of an information terminal, comprising:

a base plate having a top surface and a bottom surface;

a keyboard engaging member, disposed on said bottom surface of said base plate, for detachably engaging with a system engaging member of said system unit to pull said keyboard unit toward said system unit; and a plurality of input keys disposed on a top surface of said base plate opposite to the bottom surface on which said keyboard-unit-side engaging member is disposed wherein said keyboard engaging member is configured to have a varying radial dimension and said system engaging member is a hairpin spring wherein two tip portions of said hairpin spring are fixedly positioned by a pin base.

* * * * *